United States Patent
Hsu et al.

(10) Patent No.: US 6,853,845 B2
(45) Date of Patent: Feb. 8, 2005

(54) MOBILE PHONE ENHANCED CELL COVERAGE DETERMINING METHOD AND SYSTEM FOR SAME

(75) Inventors: Ching-Hsiang Hsu, Taipei (TW); Saint-Yue Ran, Taipei (TW)

(73) Assignees: Far Eastone Telecommunications, Co., Ltd. (TW); Riti Taiwan, Inc. (TW)

( * ) Notice: Subject to any disclaimer, the term of this patent is extended or adjusted under 35 U.S.C. 154(b) by 633 days.

(21) Appl. No.: 09/930,610

(22) Filed: Aug. 15, 2001

(65) Prior Publication Data

US 2003/0017829 A1 Jan. 23, 2003

(51) Int. Cl.$^7$ ................................................. H04Q 7/20
(52) U.S. Cl. ..................... 455/449; 455/444; 455/561; 455/562.1; 370/329; 370/339
(58) Field of Search ................................ 455/449, 444, 455/446, 443, 561, 562.1, 456.6; 370/328, 329, 334, 336, 339; 343/757, 878, 879

(56) References Cited

U.S. PATENT DOCUMENTS

| | | | | |
|---|---|---|---|---|
| 5,390,339 A | * | 2/1995 | Bruckert et al. | 455/440 |
| 5,924,037 A | * | 7/1999 | Mao | 455/447 |
| 5,970,411 A | * | 10/1999 | Faruque | 455/447 |
| 6,097,708 A | * | 8/2000 | Mao | 370/329 |
| 6,101,176 A | * | 8/2000 | Honkasalo et al. | 370/335 |
| 6,366,790 B1 | * | 4/2002 | Kim | 455/562.1 |
| 6,477,379 B2 | * | 11/2002 | Kingdon | 455/456.1 |
| 2002/0077154 A1 | * | 6/2002 | Judson et al. | 455/562 |
| 2002/0193139 A1 | * | 12/2002 | Mildh et al. | 455/552 |

* cited by examiner

*Primary Examiner*—William Trost
*Assistant Examiner*—Danh C Le
(74) *Attorney, Agent, or Firm*—Baker & McKenzie LLP

(57) ABSTRACT

This is a method and system for determining an enhanced cell coverage locating a mobile terminal in a cellular mobile communication system. The overall range of the mobile communication system is divided into a plurality of pixels, and then a pixel map including all pixels is constructed. One antenna with a shortest distance to each pixel is set as a serving antenna, and the nearest antenna to a pixel is found. This pixel then belongs to the cell of this antenna, in which the distance therebetween is smallest and all pixels belonging to a cell constitutes a pixel coverage of this cell. A rectangular area is then constructed covering the pixel coverage, and a smallest circle cover this rectangular area is constructed as the enhanced cell coverage of the antenna. Thereby, the system provider may provide require information to the mobile terminal in that coverage.

17 Claims, 13 Drawing Sheets

MOBILE PHONE ENHANCED CELL COVERAGE DETERMINING METHOD AND SYSTEM FOR SAME

FIELD OF THE INVENTION

The present invention relates generally to mobile communication systems, and more particularly to a method and system for precisely determining the locations of mobile terminals in a mobile communication system.

BACKGROUND OF THE INVENTION

GSM (Global System for Mobile communication) is the very popular second generation digital cellular mobile communication standard defined by the European Telecommunications Standards Institute. FIG. 1 is a schematic diagram showing a configuration of a conventional GSM system 10. The GSM system 10 includes Mobile terminals (MS) 12, Base Station Subsystems (BSS) 14, each composed of a plurality of Base Transceiver Stations (BTS) 16 and a Base Station Controller (BSC) 18, and a Network and Switch Subsystem (NSS) 22 composed of a plurality of Mobile Switching Centers (MSC) 20, Home Location Registers (HLR) 30, Visitor Location Registers (VLR) 32 and Authentication Centers (AuC) 34. The Mobile terminal (MS) 12 denotes physical equipment, such as a car phone or other portable phone, used by mobile subscribers to communicate with other mobile subscribers within the subscribed network or with users outside the subscribed network, such as users within a Public Switched Telephone Network (PSTN) 24. The Mobile Switching Centers (MSC) 20, utilized to switch communicating connections, are communicable with a Public Switched Telephone Network (PSTN) 24 and with at least one Base Station Controller (BSC) 16. The Base Station Controller (BSC) 18 is utilized to handover radio connections, and the Base Transceiver Station (BTS) 16 includes physical equipment, such as a radio tower, for transmitting and receiving radio signals. The Home Location Registers (HLR) 30 is a database maintaining all subscriber information, such as user profiles, current location information, International Mobile Subscriber Identity (IMSI) numbers and other administrative information. The Visitor Location Registers (VLR) 32 is a database containing location information about all of the Mobile terminals (MS) 12. The Authentication Center (AuC) 34 is connected to the Home Location Register (HLR) 30 and provides it with authentication parameters and ciphering keys utilized for security purposes.

With reference to FIG. 2, a GSM Public Land Mobile Network (PLMN), designated by reference numeral 200, is shown, which is composed of a plurality of areas 220, each comprising a Mobile Switching Center (MSC) 240 and an integrated Visitor Location Register (VLR) 260. MSC/VLR areas 220 include a plurality of Location Areas (LA) 280, which are defined as that part of a given MSC/VLR area 220 in which a Mobile terminal (MS) 300 may move freely without having to send update location information to the MSC/VLR area 220 that controls the Location Area (LA) 280. Each Location Area 280 is divided into a number of cells 320, for example one to three cells. It should be noted that the Base Station controller (BSC) 250 may be connected to several Base Transceiver Stations (BTS) 270, and may be implemented as a stand-alone node or integrated with the Mobile Switching Center (MSC) 240. In either case, the Base Station Controller (BSC) 250 and the Base Transceiver Station (BTS) 270, as a whole, are generally referred to as Base Station Subsystems (BSS) 320.

A GSM system consists of a plurality of Base Station Subsystems (BSS), and each Base Station Subsystem (BSS) is composed of several cells having their specific coverage area related to the physical location and the antenna direction of the Base Station Subsystems (BSS). When a Mobile terminal (MS) is making a phone call or sending a short message, it must locate in the coverage area of one cell. By mapping the cell database and Cell ID, the area where the Mobile terminal (MS) is located is known in a process called Cell Global Identity (CGI). A CGI is a sub-unit of a location area and defines the particular cell within which the Mobile terminal (MS) is located. Each cell includes Network Name, MSC, BSC number, Site ID, Type (Macro type, Micro Type, Indoor Cell, Outdoor Cell), location (longitude, latitude), Cell number, antenna direction, type, height and Excess Information Rate of the antenna.

Typical GSM systems currently utilize Time Division Multiple Access (TDMA) to handle radio traffic in each cell such that each frequency is shared by eight users. The length of a GSM time frame is 4.615 ms, and is divided into eight time slots by TDMA techniques. However, in other systems utilizing TDMA, more or fewer time slots may by used. The uplink time frame occurs later than the downlink time frame by three time slots, so as to prevent the Mobile terminal (MS) from transmitting and receiving signals simultaneously. Since the distance between each Mobile terminal (MS) and the serving Base Station Subsystems (BSS), as well as the transmission time for radio signals, is not constant, it is necessary to provide specific devices to effect synchronization; that is, the Timing Advance (TA) value must be adjusted to ensure that there is the three time slots difference between uplink and downlink frames. The Timing Advance (TA) value is calculated in accordance with the uplink signals received by Mobile terminals (MS) and is reported approximately twice every second.

For a GSM system, a GMSK modulation is used with a data rate of 270 Kbits per second, therefore, each bit occupies a pulse with a length of approximately 1100 m (c/(270 Kbits/sec), where c is light speed). Since time synchronous signals are transmitted from the Mobile terminal to the Base Transceiver Station, and then round back from the Base Transceiver Station to be received by the Mobile terminal, a resolution of approximately 550 m (1100 m÷2) is achieved. The Timing Advance (TA) value is a number ranging from 0–63, with each number corresponding to approximately a 550 meter radial distance from a receiving Base Transceiver Station (BTS).

Referring to FIGS. 3a and 3b, in general, from the viewpoint of directivities of antennas, the base stations can be classified into two types. One is equipped with an omnidirectional antenna 301 as illustrated in FIG. 3a, where the antenna pattern 310 is omnidirectional, and thus, the base station acquires no information about the aspect of the mobile terminal. In general, this type of base station is installed in relatively lower traffic areas. The other type of Base Station system is typically used in a high traffic area, with the base station being equipped with several directional antennas, one of which is shown in FIG. 3b as 302, whereby each antenna pattern is concentrated for narrow coverage, and different antennas point in different orientations. Thus, each antenna controls a sector region as shown at 320. For example, if there are three antennas (not shown) mounted on a Base Station subsystem, then the main lobe of each antenna is directed to a different direction so that the lobes of the three antennas are spaced equally with an angle difference of 120 degrees. In general, since only signals from those mobile phones within the coverage of the antenna are received by the antenna, each antenna controls a sector region with an angle coverage of 120 degrees.

Once a Timing Advance (TA) value is determined for one Base Transceiver Station (BTS), the distance between the MS and that particular Base Transceiver Station (BTS) is known, but the actual location is not. If the Timing Advance (TA) value equals zero, the Mobile terminal (MS) could be anywhere in a circular region of radius of 550 meters. If the Timing Advance (TA) value equals one, the Mobile terminal (MS) could be anywhere in an annular region from a radius of 550 meters to a radius of 1100 meters. Even for a Base Station Subsystems (BSS) composed of three sector cells which cover a fan-shaped 120 degrees respectively, when the Timing Advance (TA) value equals zero, the Mobile terminal (MS) is located in an sector area of radius of 550 meters; when the Timing Advance (TA) value equals one, the Mobile terminal (MS) is located in a sector area of inner radius of 550 meters and an outer radius of 1100 meters.

A prior art searching method is disclosed by Ericsson (ETSI TS 100 912 V8.6 (2000-11), *Technical Specification, Digital cellular telecommunication system (phase 2+), radio subsystem synchronization* (3GPP TS 05.10 version 8.6.1 Telease 1999) where the searching regions are initially classified according to the searching area. Referring to FIG. 4, for a Base Station Subsystem utilizing an omnidirectional antenna, since no directivity information can be provided (i.e., the Base Station Subsystem has no information about the aspect of the mobile terminal), the searching region is an annular area 402 having a radius determined by the Timing Advance (TA). For the first searching region with TA=0, the searching region is a round section 401 with a radius of 550 m and thus the region has an area of about 0.95 km². For the second searching region with TA=1, the searching region is an annular section 402 with an inner radius of 550 m and an outer radius of 1100 m and thus has a searching area of about 2.85 km², being three times greater than searching region 401. Because of this large area, it is unrealistic, especially for a pedestrian, to search for an object in this larger area. In fact, each time the TA is increased by one, the searching area will become $((TA+1)^2-1)$ times of the first search region; i.e., the third searching region with TA=2 will have an area eight times the first region. Thus, the area increases rapidly so that it becomes unfeasible for a user to search for an object in such a large area.

For those Base Station Subsystems utilizing directional antennas, as stated above, each antenna controls a sector section. Assuming that there are three antennas in the Base Station System, each antenna controls a sector region with an angle coverage of 120 degrees. For the case of a Base Station Subsystem with directional antennas, to derive the search regions, it is necessary to firstly find the sector region and then determine a search region from this sector region. In this case, the sector region has a radius determined by the TA. For the first sector region with TA=0, the region has a sector shape having a radius of 550 m and thus, the region has an area of about 0.32 km². For the second sector region with TA=1, the region is a sector with an inner diameter of 550 m and an outer diameter of 1100 m (as illustrated in FIG. 4), thus having an area of about 0.95 km², which is three times the former area. For the third searching region with TA=2, the region is a sector with an inner diameter of 1100 m and an outer diameter of 1650 m and thus has an area of about 2.85 km², being eight times the first area. Again, this is a large area. In fact, each time TA is increased by one, the area becomes $((TA+1)^2-1)$ times the first search region; i.e., the third sector region with TA=2 will have an area eight times the first region, and for TA=3, the area of the sector becomes 15 times the second region, and so on.

Ericsson's method to define the search region for cells utilizing directional antennas utilizes a circular region with a center being at the middle point of the line forming the maximum diameter of the region. Therefore, for the first search region with TA=0, the area thereof is 2.25 times (i.e., $[((3/)^{1/2}A/2)^2\pi]/[(1/3)\pi A^2]$) the sector region with TA=0. For TA=1, the ratio of the search region to the sector region becomes larger. Typically, a telecommunications company provides information regarding the locations of restaurants, drug stores, gasoline stations, and the like, within the search region to the mobile terminal in the corresponding sector region. However, the conventional system's search region is too large for most purposes. For example, if TA=2, the search region will be nearly 3 km², a too large area for a pedestrian to search for a particular object.

The problem with conventional systems such as Ericsson's is that the scale of 550 m is too large to be generally useful. Such a large 550 meters scale utilized in Mobile terminal (MS) location determination is clearly inadequate and is very impractical for mobile subscribers in an urban area for specific services, particularly urgent needs such as emergency aid. Moreover, neighboring cells and directions can not be handled. Therefore, there is a need for a new method and system to define search regions providing higher resolution so that a telecommunication system can provide useful information to mobile subscribers.

SUMMARY OF THE INVENTION

In view of the above, the principal object of the present invention is to provide an enhanced cell coverage method and system for more precisely locating a mobile terminal in a time-division multiple access mobile communication system.

To achieve this and other objects, the present invention provides a method and system for determining an enhanced cell coverage locating a mobile terminal in a cellular mobile communication system having a cell database containing the relationship between cells, base stations, and antennas. The overall range of the mobile communication system is divided into a plurality of pixels, each having a constant width and a constant length, and constructing a pixel map including all said pixels, then searching all antennas proximate to each pixel, calculating the distances between each pixel and its corresponding proximate antennas, setting one antenna with a shortest distance to each pixel as a serving antenna, and finding the nearest antenna to a pixel. This pixel then belongs to the cell of this antenna, in which the distance therebetween is smallest and all pixels belonging to a cell constitutes a pixel coverage of this cell. A rectangular area is then constructed covering the pixel coverage and having a length of the maximum longitudinal extent of the pixel coverage and a width of the maximum transversal extent of the pixel coverage. An enhanced cell coverage confined by a circle having a center at the intersecting point of the diagonal lines of the rectangular area and a radius of one half of said diagonal line, and the circle then covers the pixel coverage completely and has the smallest radius and a center location where an antenna of the cell is located.

Additional advantages, objects and features of the present invention will become apparent from the drawings and description which follows.

BRIEF DESCRIPTION OF THE DRAWINGS

The present invention is disclosed in the detailed description given hereinbelow and the accompanying drawings, which are presented as means of illustration only and thus are not limitative of the present invention, in which.

DETAILED DESCRIPTION OF THE INVENTION

Prior art mobile communications cell coverage resolution is limited by the resolution of GSM signals, 550 m, which is strictly determined by the bit rate of the system. The present invention provides a system and method for enhanced the resolution by taking into consideration information about the distribution of antennas and Base Transceiver Stations in the communications system. The mobile communication system company knows the precise distributions of antennas and Base Transceiver Stations in their system. The present invention utilizes this information to provide a more precise knowledge of the position of a Mobile terminal with an error lower than the resolution of the GSM signal, 550 m, provided that the distances between antennas or Base Transceiver Stations are lower than the resolution of the system. The present invention provides a system and method wherein both the distributions of the antenna and Base Transceiver Stations, and the Timing Advance (TA) are taken into consideration, thereby producing a cell map with a enhanced cell coverage smaller or at least equal to that provided by Timing Advance.

Figure 1:
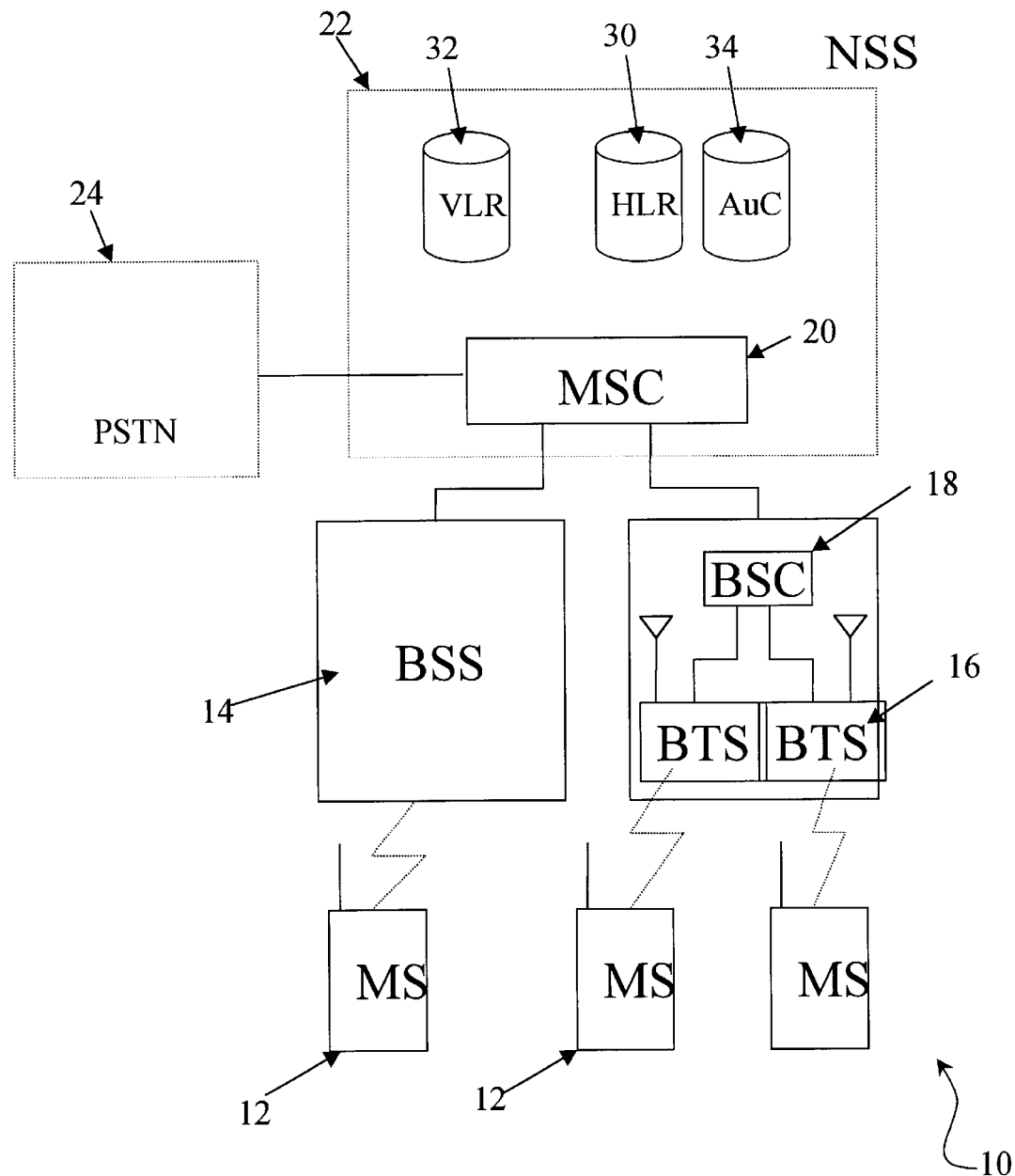
FIG. 1 is as schematic drawing showing a digital GSM system according to the prior art.
Figure 2:
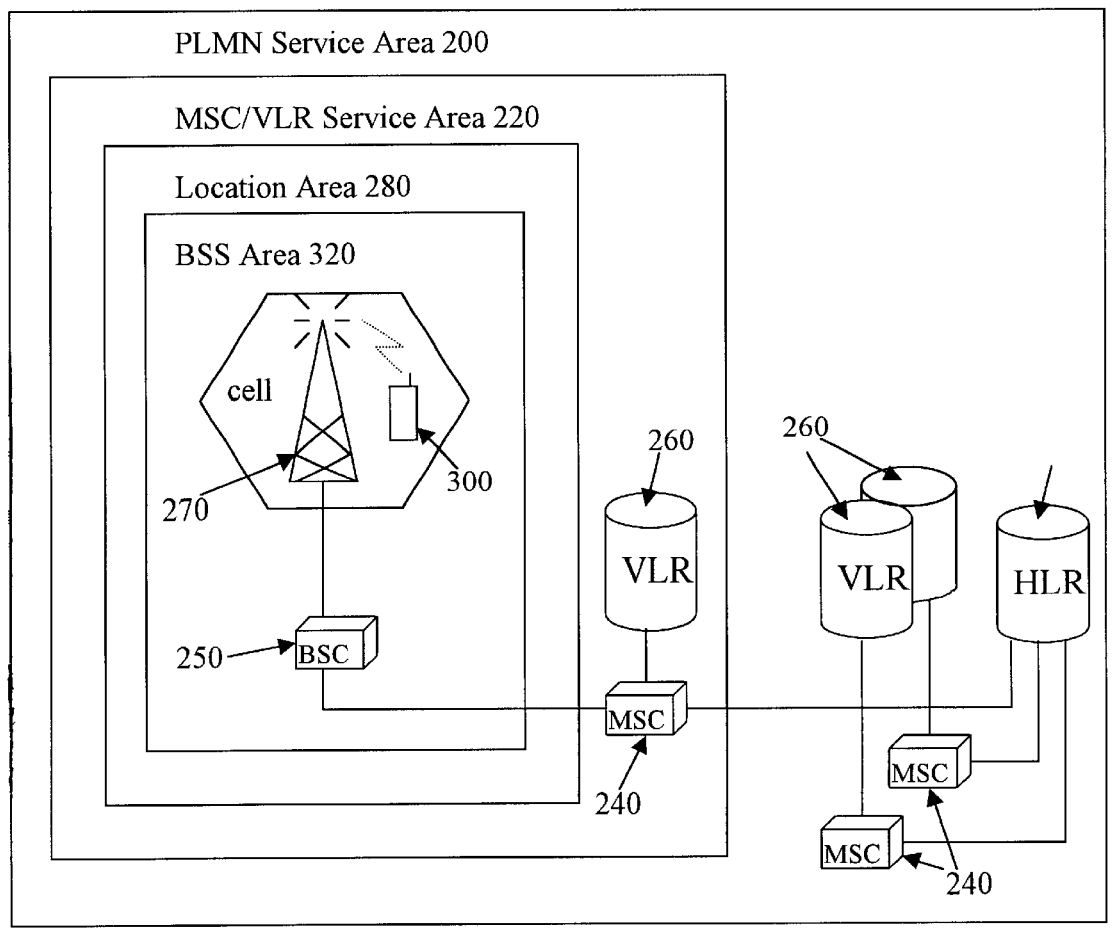
FIG. 2 is a block diagram showing a conventional terrestrially-based wireless telecommunication system.
Figure 3B:
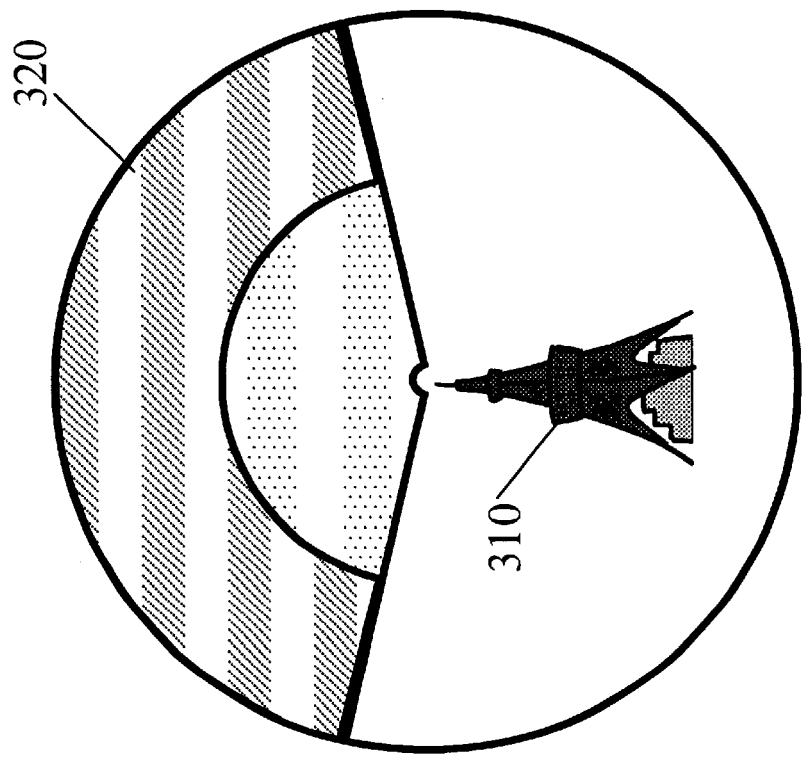
FIG. 3b shows a Base Transceiver Station equipped with directional antennas according to the prior art.
Figure 3A:
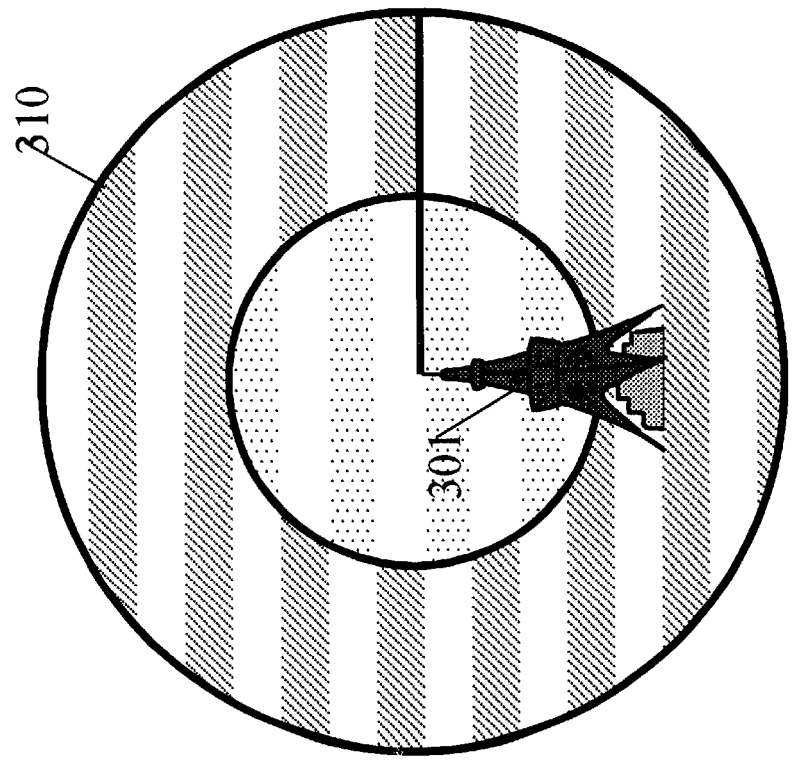
FIG. 3a shows a Base Transceiver Station equipped with an omnidirectional antenna according to the prior art.
Figure 4:
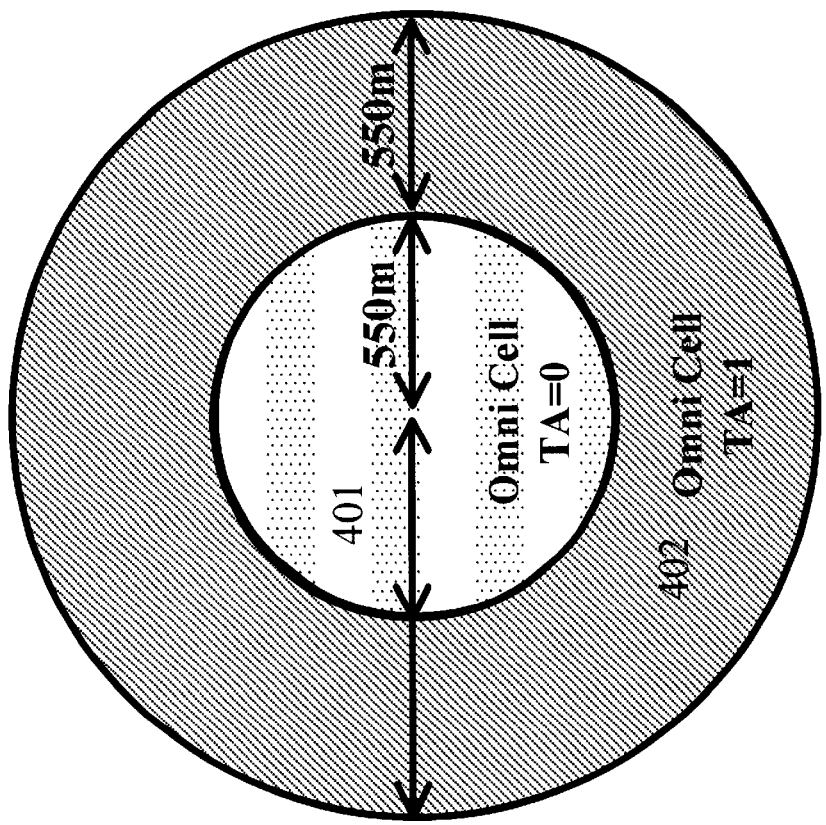
FIG. 4 shows the conventional means for deriving a search region for an omnidirectional antenna of a Base Transceiver Station.
Figure 5:
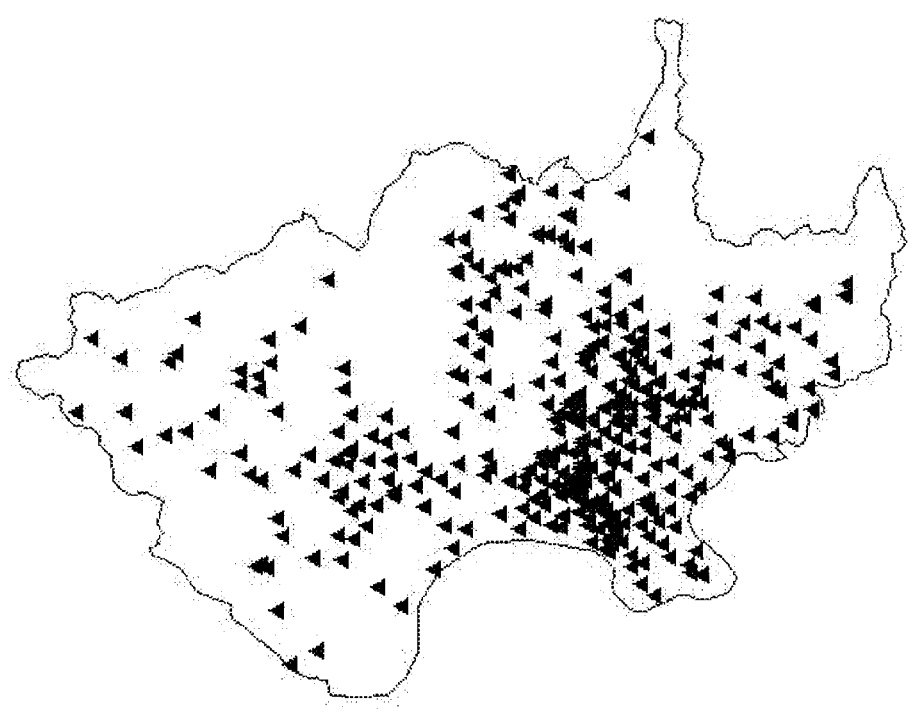
FIG. 5 shows the Base Transceiver Stations' distribution in Taipei city of the FarEasTone mobile telephone service.
Figure 6:
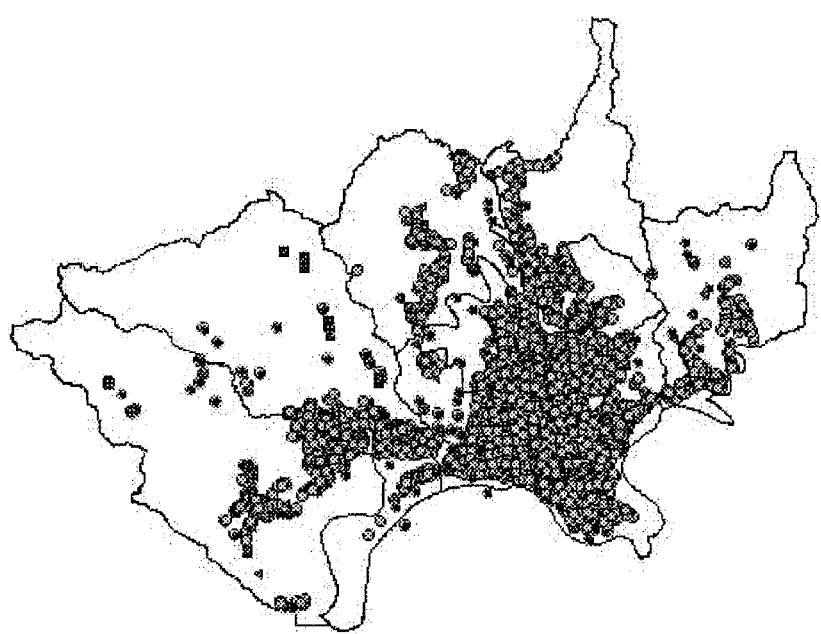
FIG. 6 shows the information density in Taipei city according to FarEasTone data.

As an illustrative example, FIG. 5 shows a Base Transceiver Stations distribution in Taipei city of a local telecommunications company FarEasTone, and FIG. 6 shows the information density in Taipei city provided by data from FarEasTone. From these figures, it is apparent that the distribution of the Base Transceiver Stations is approximately mapped to the information density. Namely, the higher the distribution of the Base Transceiver Stations, the larger the information density. Furthermore, in many places, the spacings between Base Transceiver Stations are smaller than the resolution of a GSM signal, 550 m. In some cases, the distance between two antennas is only about 50 m. Therefore, the present invention contemplates that it is possible to identify the location of a Mobile terminal within a coverage having a dimension of smaller than 550 m if the Base Transceiver Station to which the Mobile terminal belongs can be identified.

In order for a mobile communication system, such as a GSM system, to provide adequate coverage and capacity, a high base station density is necessary for high density traffic and dense information service areas (such as urban areas). In such areas, the coverage area of each base transmission station is relatively small and the serving area thereof typically less than a scale of 550 meters. That is, although the coverage area of one base transmission station is still in the scale of 550 meters, mobile terminals within this area may be served by other base transmission stations depending on the distance between the mobile terminal and the base transmission stations.

Therefore, in addition to a cell database having general cell information, the present invention integrates a mapping database of specific indoor cells and a mapping database of specific outdoor small cells into a static Cell-ID to reference point and range database. From this integrated database, an enhanced coverage of each cell is determined, which has higher resolution than the general coverage on the scale of 550 meters in the prior art. When a mobile terminal is located in an outdoor small cell or an indoor cell, the location thereof is determined by mapping the cell ID to the corresponding database. In addition, the coverage of each general cell is determined without interfering with those specific outdoor small cells and indoor cells since those specific cells are classified into different categories.

As described above, Cell Global Identity (CGI) defines the particular cell where the mobile terminal is located. The first step of the method and system for precisely determining the location of a mobile terminal according to the present invention is to enhance the precision of the CGI. Initially, the cells are classified into Macro_cells and Micro_cells. The Macro_cells are general BTSs which provides mainly outdoor coverage and have larger coverage areas, such as in open areas or lower traffic regions. The Micro_cells are sub-classified into indoor Micro_cells and outdoor Micro_cells. The indoor Micro_cells, such as cells in a department store, a restaurant, an airport building, etc., which have a high traffic capacity in a relatively small indoor area, provides high precision location according to the present invention. The outdoor Micro_cells, such as cells in an airport, a plaza, etc., cover smaller areas than the Macro_cell, and are typically utilized for so-called "hot spots" of high activity and can provide a high location precision. This classification according to the present invention increases positioning precision.

Next, a cell database is constructed according to the present invention which records the enhanced cell coverage and the class of cells. Then a mapping database is constructed containing the relationship between each cell ID of said cells and their respective coverage.

The enhanced cell coverage is then determined by noting that enhanced cell coverage is related to the following factors: distance and antenna direction to neighbor cells, coverage overlap, antenna type, height and down-tilt, antenna output power, urban, suburban, and open-area, building type, density, obstacles, and terrain. In the preferred embodiment of the present invention, the factors of distance and antenna direction to neighbor cells are adopted, while other factors are not utilized since these factors will make the calculations more complex. However, the advantageous utilization of some or all or combinations thereof of the other factors as listed above are within the contemplation of the present invention.

According to the present invention, the geometric area of, for example, a location area is then divided into a plurality of pixels, each having a constant width and a constant length (for example, width 20 meters and length 20 meters). In general, a square is a better selection for the coverage of a pixel, and the smaller the size of the pixel, the larger the total number of the pixels required. From the description hereinafter, it will be understood that as the size of each pixel decreases, the resultant location of the mobile terminal is given more precisely, the trade-off being that then more calculation is required.

Figure 7A:
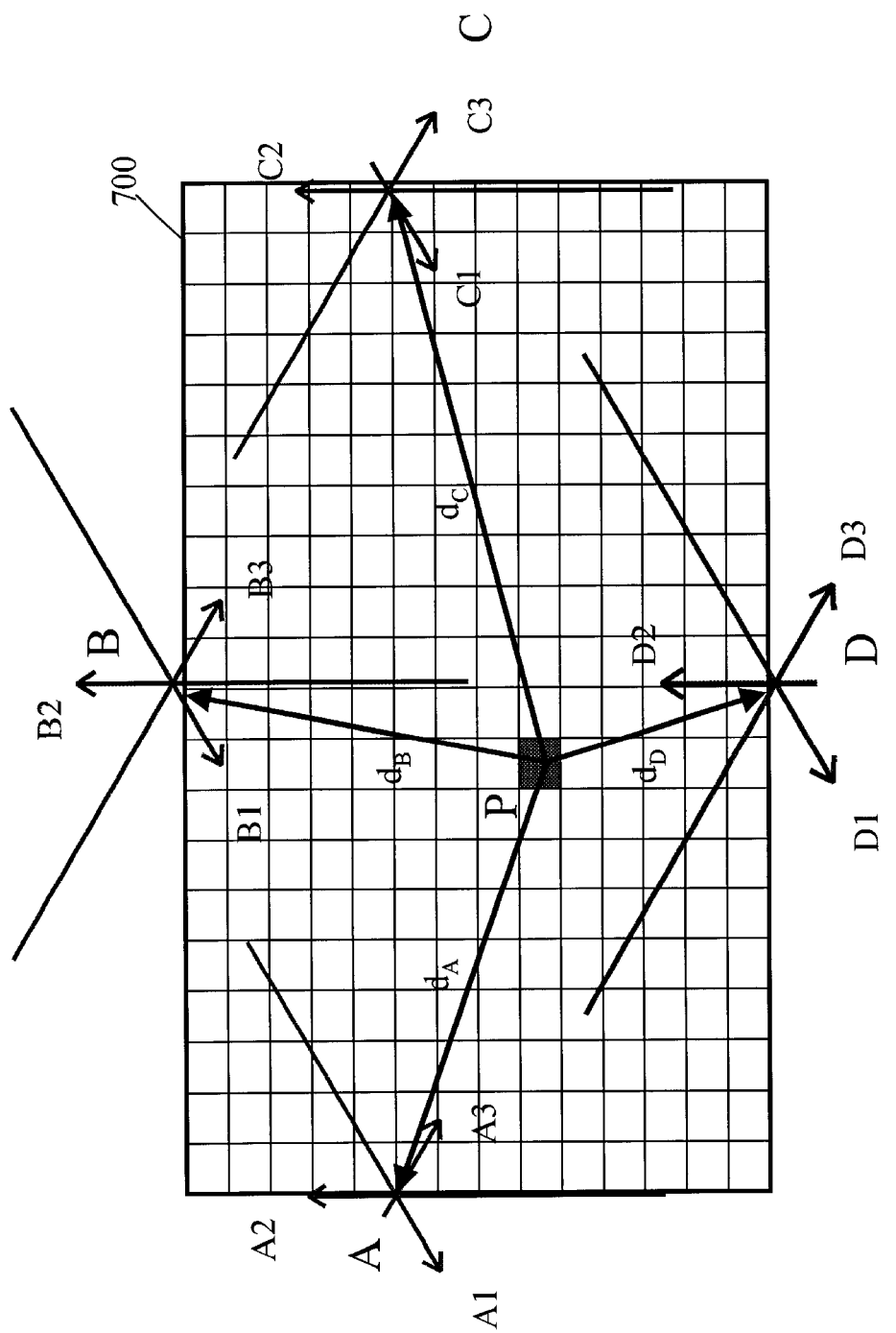
FIG. 7a illustrates a pixel distribution in an area having four Base Transceiver Stations each having three directional antennas.

FIG. 7a illustrates a rectangular pixel distribution according to the present invention in an area 700 having four Base Transceiver Stations (BTS) designated by A, B, C, and D, each having three directional antennas indicated by arrows A1, A2, and A3 for BTS A; B1, B2, and B3 for BTS B; C1, C2, and C3 for BTS C; and D1, D2, and D3 for BTS D, where the arrowhead indicates the main lobe direction of the respective antenna. The distances between a particular pixel and each antenna are calculated and the nearest antenna to this pixel is determined. Therefore, a particular pixel belongs to the cell in which the distance therebetween is smallest. For example, for the shaded pixel P in FIG. 7a, the distances $d_A$, $d_B$, $d_C$, $d_D$, to the four Base Transceiver Stations A, B, C, and D respectively are calculated, and the shortest distance is determined. In the example of FIG. 7a, the shortest distance is $d_D$. Therefore, the pixel P belongs to the cell of Base Transceiver Station D. All the pixels in area 700 are processed according to the above procedure and the pixels nearest to an antenna are within the enhanced cell coverage of that antenna.

Figure 7B:
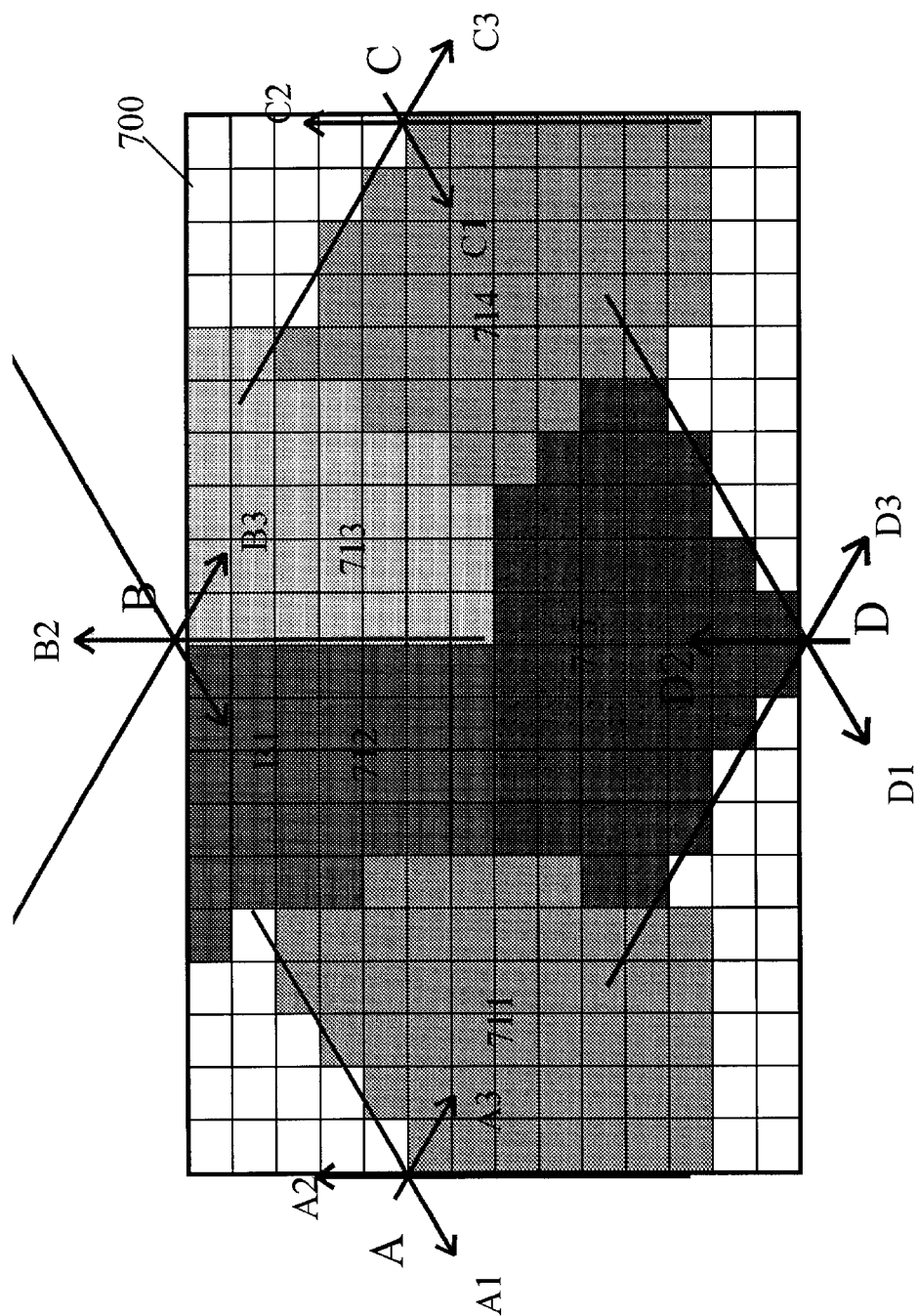
FIG. 7b is a schematic view showing four groups of pixels associated with the related antennas of the four Base Transceiver Stations.

Referring to FIG. 7b, following the above example, all pixels in area 700 are appended to the cells of an antenna. As a result, groups of pixels 711, 712, 713, 714, and 715 belonging to the related antennas A3, B1, B3, C1, and D2 respectively, of the four Base Transceiver Stations A, B, C, and D, respectively, are acquired, which are indicated by the different gray levels in FIG. 7b. For convenience, in the following, the group of pixels belonging to the same Base Transceiver Station will be termed pixel coverage.

Figure 7C:
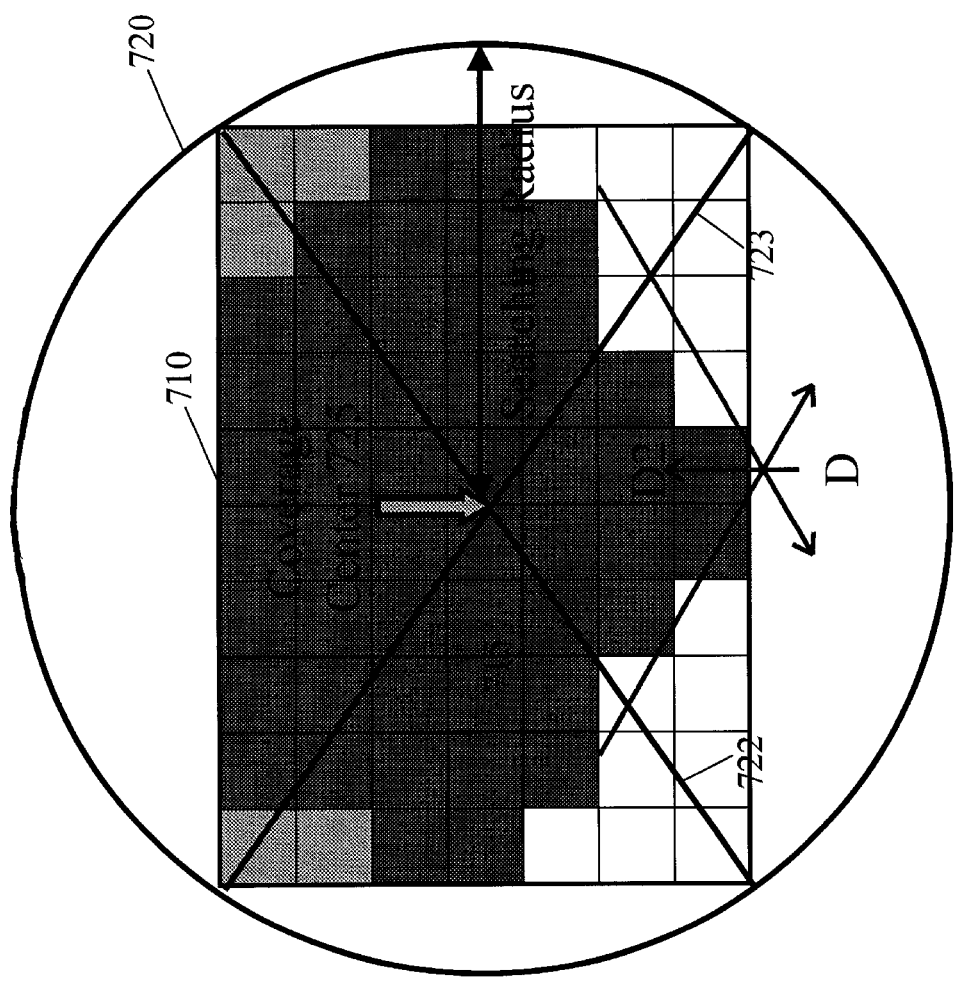
FIG. 7c shows the pixel coverage for an antenna of the Base Transceiver Station illustrating the method for enhanced cell coverage acquisition according to the present invention.

Next, with reference to FIG. 7c, the maximum longitudinal extent and maximum transversal extent of a pixel coverage is derived so as to construct a rectangular area 710 having a length of the maximum longitudinal extent and a width of the maximum transversal extent. Then, a circle 720 is constructed having a center 721 being the intersecting point of the diagonal lines 722 and 723 of the rectangular area; the circle 720 having a radius of one-half of the diagonal line. A circle (not shown) is then determined which can cover the pixels in area 710, such circle having the minimum radius and a center where the related antenna is located. For above example, the pixel coverage for the antenna D2 of the Base Transceiver Station D is illustrated in enlarged scale from FIG. 7b. It is shown that it is possible to find a circle which covers the pixel coverage.

The above-described process is performed for all the antennas of all the Base Transceiver Stations so as to construct a new cell map table according to the present invention.

To further optimize the resolution and increase computational efficiency, the physical location of the antennas of the communication system may be repositioned. In an embodiment of the present invention, the antenna repositioning is to be away from an original location of said antenna with a distance of one-half of a maximum size of a pixel.

The preferred economic embodiment of the present invention utilizes the following scheme. First, for the indoor Micro_cell, since the enhanced cell coverage is very small and can be defined precisely, and moreover, all information in the cell can be accessed, the radius of the enhanced cell coverage is forced to be zero, and, none of the operations described immediately above need be performed. Second, for some open areas, it is possible that the radius of the constructed enhanced cell coverage circle is larger than the resolution of the conventional system, so that this enhanced cell coverage will be less effective than the conventional coverage. For these particular cases, the conventional solution is adopted by the method of the present invention as the enhanced cell coverage so as to achieve a better solution. The preferred embodiment of the present invention provides the following rule incorporating the above-described factors for determining an optimum enhanced cell coverage. If the searching radius obtained from the above pixel group is smaller than 450 m and the TA=1, then the algorithm accepts the pixel group. If the searching radius is larger than 450 m and the TA=0, than the present invention utilizes the conventional solution with TA=0; for example, if the searching radius is 476.3 m, the center of the sector region is used as a center of the enhanced cell coverage. If the searching radius is larger than 450 m and TA=1, then the conventional solution with TA=1 is used; for example, if the searching radius is 952.6 m, then a center of the sector region is used as the center of the enhanced cell coverage. Third, since the antennas belonging to one Base Transceiver Station are located in the same pixel, in cell locating, a Base Transceiver Station will generate a singularity point. In order to avoid this condition, in operation, the coordinate of each antenna is moved outwards through a half pixel toward the pixel being processed. Fourth, the preferred embodiment of the present invention takes into consideration terrain features such as rivers and lakes where there are virtually no mobile terminals. Thus the pixels corresponding to these areas are deleted from the operation of the algorithm of the present invention, thereby producing computational efficiency.

Figure 8:
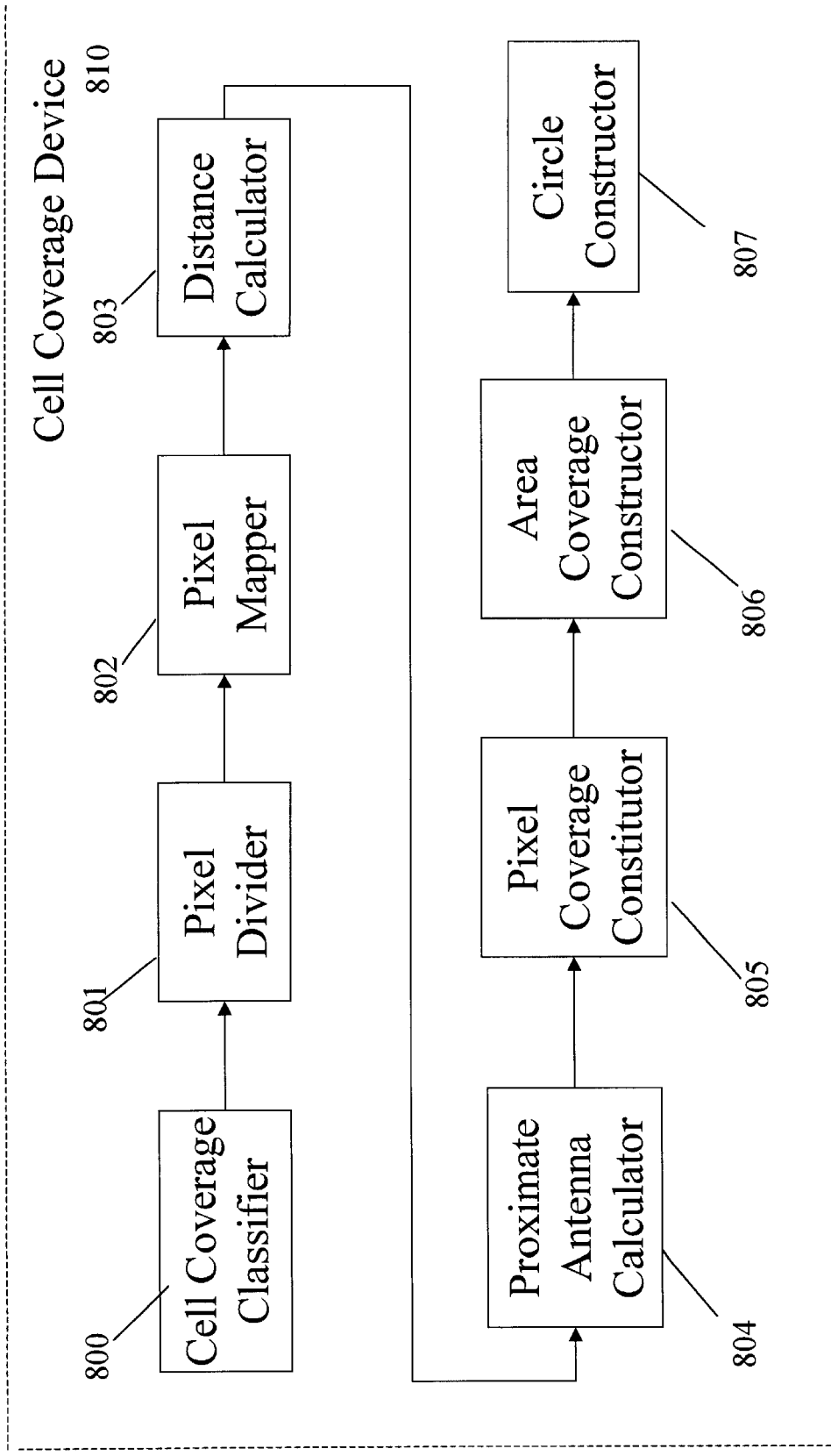
FIG. 8 is a block diagram showing an embodiment of the device of the present invention not utilizing Timing Advance.

The present invention also provides a device for performing the above described process for generating an enhanced cell coverage of a Base Transceiver Station. FIG. 8 is a block diagram showing an embodiment of an enhanced cell coverage device 810 not utilizing Timing Advance (TA). Enhanced cell coverage device 810 comprises a cell coverage classifier 800 for classifying each of the plurality of antenna coverages into the classifications of outdoor macro cells, outdoor micro cells and indoor micro cells, the classification being responsive to the covering range, antenna directivity and traffic of the antenna. A pixel generator 801 is coupled to the cell coverage classifier 800 for dividing the communication system coverage of the mobile communication system into a plurality of pixels. A pixel mapper 802 is coupled to the pixel generator 801 for constructing a pixel map comprising all of the locations of the plurality of pixels. A distance calculator 803 is coupled to the pixel mapper 802 for calculating distances between each pixel and its corresponding proximate antennas. A proximate antenna selector 804 is coupled to the distance calculator 803 for determining which one of the antennas has the shortest distance to a selected pixel to serve as a serving antenna of the selected pixel. A pixel coverage constitutor 805 is coupled to the proximate antenna selector 804 for determining a pixel coverage of the serving antenna by all of pixels having a shortest distance to the serving antenna. An area coverage constructor 806 is coupled to the pixel coverage constitutor 805 for constructing a rectangular area covering the pixel coverage. A circle constructor 807 is coupled to the area coverage constitutor 806 for determining the enhanced cell coverage defined by a circle having a center is the intersecting point of the diagonal lines of the rectangular area and a radius of one-half of the diagonal line.

Figure 9:
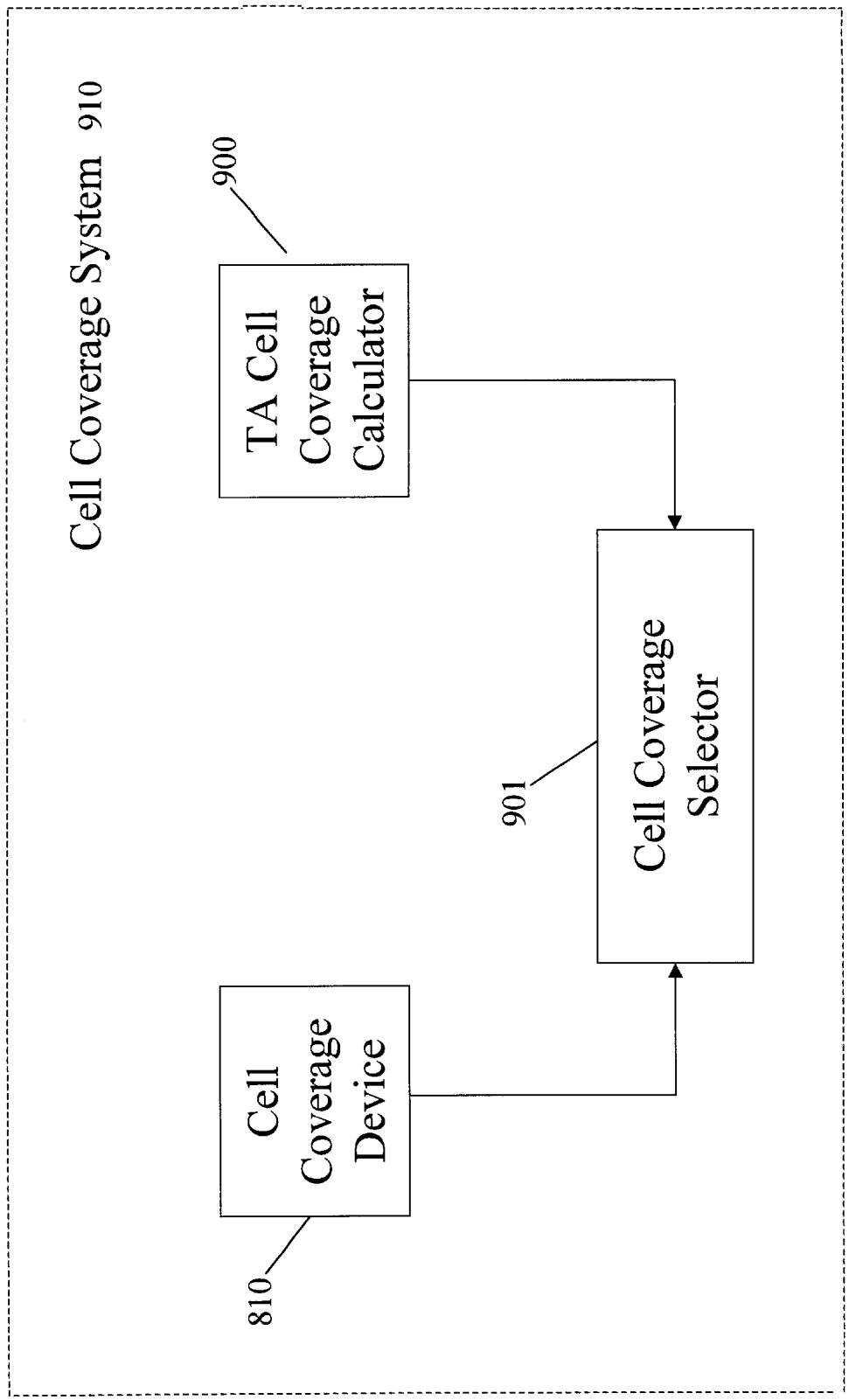
FIG. 9 is a block diagram showing an embodiment of the device of the present invention utilizing Timing Advance.

FIG. 9 is a block diagram of an embodiment of an enhanced cell coverage system 910 incorporating TA. In this embodiment, the conventional TA method is advantageously utilized. Enhanced cell coverage system 910 includes a TA cell coverage calculator 900 which constructs a cell coverage based on the conventional mobile communication system utilizing TA. TA cell coverage calculator 900 and enhanced cell coverage device 810 are coupled to an enhanced cell coverage selector 901 which selects a minimum from the enhanced cell coverage produced by enhanced cell coverage device 810 and the TA cell coverage produced by TA cell coverage means 900 as the enhanced cell coverage of the antenna of the base station. Therefore, the optimum result selected from the enhanced cell coverage of the first embodiment and the cell coverage derived from the conventional TA method is adopted.

Figure 10:
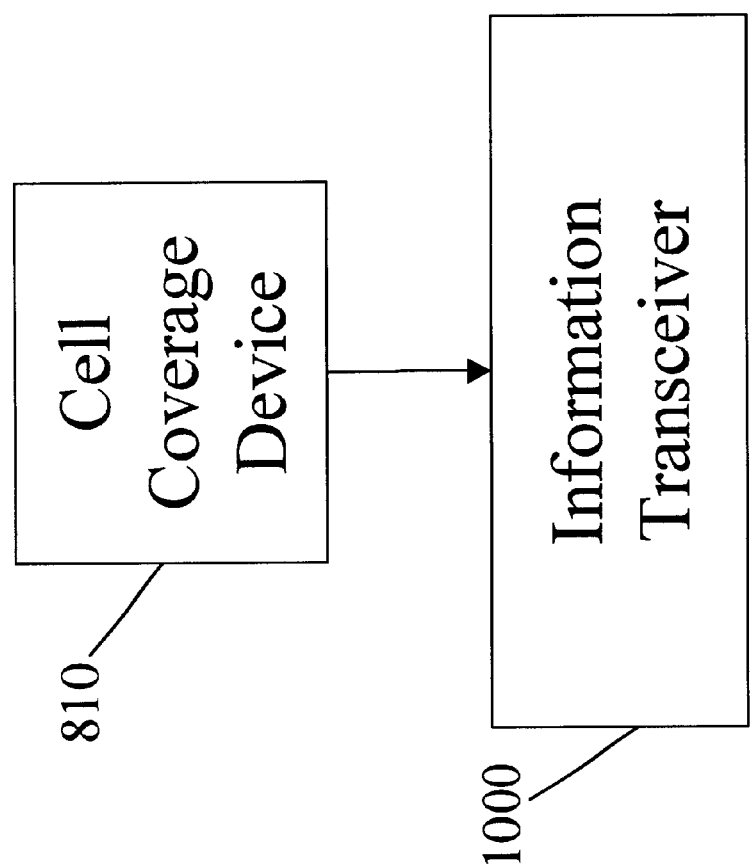
FIG. 10 is a block diagram showing an embodiment of the system of the present invention not utilizing Timing Advance.

The present invention also provides a system which includes means for transmitting information to a cell having an enhanced cell coverage derived from the above described process. For example, the present invention provides address information of particular types of businesses, such as restaurants, gas stations, shopping centers and the like, to mobile subscribers to provide effective information for those making calls for help. FIG. 10 is a block diagram showing an embodiment of the system of the present invention not utilizing TA. An information transceiver 1000 receives signals from one of the plurality of mobile terminals containing information about the enhanced cell coverage and then locating the mobile terminal and subsequently transmitting the information about the enhanced cell coverage locating the mobile terminal to the mobile terminal.

Figure 11:
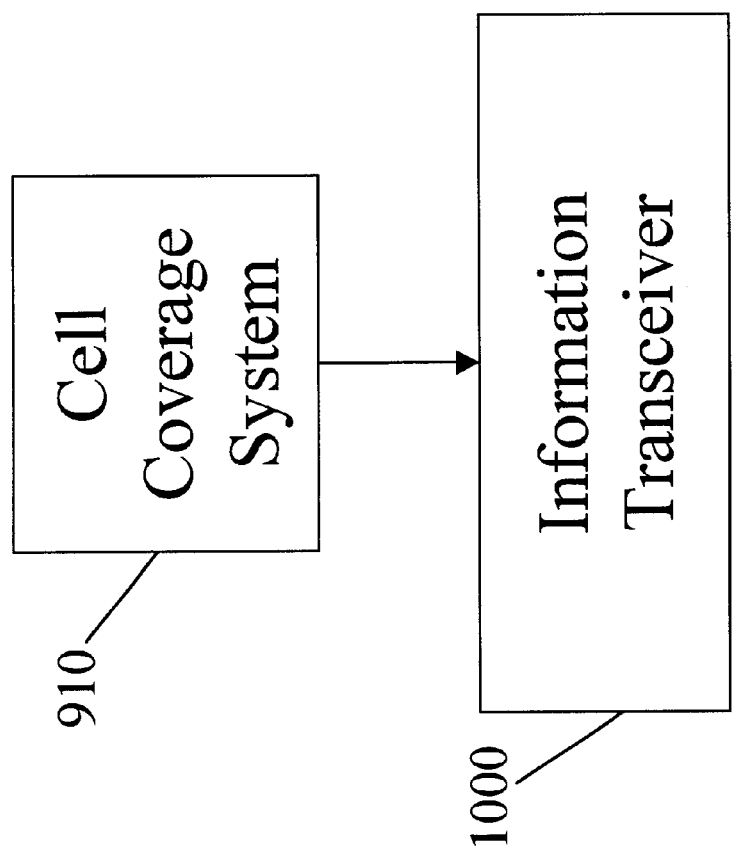
FIG. 11 is a block diagram showing an embodiment of the system of the present invention utilizing Timing Advance.

FIG. 11 is a block diagram showing an embodiment of the system of the present invention utilizing TA. The system includes enhanced cell coverage system 910 coupled to an information transceiver 1000 which receives a signal from one of the plurality of mobile terminals providing an enhanced cell coverage for locating the mobile terminal and then transmitting information about the enhanced cell coverage for locating the mobile terminal to the mobile terminal thereby optimizing the enhanced cell coverage resolution by taking into consideration both the enhanced cell coverage generated by enhanced cell coverage device 810 and TA cell coverage 900 and selecting one enhanced cell coverage by cell coverage selector 901.

In summary, the present invention enhances the precision of CGI. For some cells, especially those in areas of high cell density, a circular area for coverage with a radius of 50–450 meters is obtained. Since the resultant radius of the coverage is smaller than the scale of 550 meters obtained in prior art, the present invention more precisely determines the location of a mobile terminal. For other cells, if the resultant radius of the circular area for coverage is larger then 450 meters or even larger than 1000 meters, then conventional CGI is utilized by the present invention to determine the coverage. Therefore, the coverage and thus the location of a mobile terminal according to the present invention is optimized and is always more precise than that achieved by conventional means.

While the above is a full description of the specific embodiments, various modifications, alternative constructions and equivalents may be used. For example, the present invention also contemplates communications networks utilizing other coding devices such as code division multiple access (CDMA) and frequency division multiple access (FDMA) as well as any other system for which antenna sectoring is utilized. Further, any combination of the factors such as coverage overlap, antenna type, height and down-tilt, antenna output power, urban, suburban, and open-area, building type, density, obstacles, and terrain mentioned above that can be taken into consideration to optimize locating precision are within the scope of the present invention. Therefore, the above description and illustrations should not be taken as limiting the scope of the present invention which is defined by the appended claims.

What is claimed is:

1. A method for determining an enhanced cell coverage in a mobile communication system having a plurality of mobile terminals, a plurality of base stations each including at least one antenna, and a cell database containing the relationship between a plurality of cells, the plurality of base stations, and the antennas, the mobile communication system having a communication system coverage for receiving signals and each of the antennas having an antenna coverage for receiving signals, wherein the communication system coverage is divided into a plurality of unit sections, the method comprising the steps of:

(1.1) designating each one of the plurality of unit sections to be associated with an antenna of one of said plurality of base stations for each of the antennas, said designation being responsive to the shortest distance from a unit section to an antenna, said shortest distance being determined in comparison with the distance from a unit section to all the other antennas in the communication system; and (1.2) forming a plurality of enhanced cell coverages of said antenna of said base station, wherein said plurality of enhanced cell coverages includes all of the plurality of said designated unit sections for all of the antennas in the communication system.

2. The method of claim 1, wherein said step (1.1) further comprises steps of:

(2.1) classifying each of said plurality of antenna coverages as outdoor macro cells, outdoor micro cells and indoor micro cells, said classification responsive to the covering range, antenna directivity and traffic of said antenna;

(2.2) dividing said communication system coverage into a plurality of pixels;

(2.3) constructing a pixel map comprising all of the locations of said plurality of pixels;

(2.4) determining the distances between each of said plurality of pixels and its nearest proximate antenna;

(2.5) determining which one of the antennas has the shortest distance to a selected pixel, said antenna being a serving antenna of said selected pixel;

(2.6) constituting a pixel coverage of said serving antenna by selecting all of said pixels having a shortest distance to said serving antenna;

(2.7) constructing a rectangular area covering said pixel coverage; and (2.8) constructing a circle having a center being the intersecting point of the diagonal lines of said rectangular area and a radius of one-half of said diagonal line.

3. The method of claim 2, wherein said step (2.6) further comprises a step of removing from said pixel map those pixel coverages in which a predetermined small number of mobile terminals are located.

4. The method of claim 2, wherein said step (2.4) further comprises a step of repositioning a location of an antenna to be away from an original location of said antenna with a distance of one-half of a maximum size of a pixel.

5. The method of claim 2, wherein said step (2.8) further comprises a step of setting a radius to be zero responsive to said cell being an indoor micro cell.

6. The method of claim 2, wherein said step (2.7) further comprises a step of designating a maximum longitudinal extent of said pixel coverage to be a length of said rectangular area, and designating a maximum transversal extent of said pixel coverage to be a width of said rectangular area.

7. The method of claim 1, wherein the mobile communication system is a time-division multiple access mobile communication system.

8. The method of claim 7, wherein the time-division multiple access mobile communication system is a digital GSM system.

9. A method for determining an enhanced cell coverage in a mobile communication system having a plurality of mobile terminals, a plurality of base stations each including at least one antenna, and a cell database containing the relationship between a plurality of cells, the plurality of base stations, and the antennas, the mobile communication system having a communication system coverage for receiving signals and each of the antennas having an antenna coverage for receiving signals, wherein the communications system coverage is divided into a plurality of unit sections, the method comprising the steps of:

(9.1) designating one of the plurality of unit section to be associated with an antenna of one of the plurality of base stations for each of the antennas, said designation being responsive to the shortest distance from said unit section to said antenna, said shortest distance being determined in comparison with all the other antennas in the communication system, and forming a first enhanced cell coverage of said antenna of the base station, wherein said first enhanced cell coverage includes all of the unit sections having a shortest distance to said antenna;

(9.2) forming a second enhanced cell coverage responsive to the time advance method of the mobile communication system; and (9.3) selecting a minimum from said first enhanced cell coverage and said second enhanced cell coverage as an enhanced cell coverage of the antenna of said base station.

10. The method of claim 9, wherein said step (9.1) further comprises steps of:

(10.1) classifying each of said plurality of antenna coverages as outdoor macro cells, outdoor micro cells and indoor micro cells, said classification responsive to the covering range, antenna directivity and traffic of said antenna;

(10.2) dividing said communication system coverage into a plurality of pixels;

(10.3) constructing a pixel map comprising all of the locations of said plurality of pixels;

(10.4) determining the distances between each of said plurality of pixels and its nearest proximate antenna;

(10.5) determining which one of the antennas has the shortest distance to a selected pixel, said antenna being a serving antenna of said selected pixel;

(10.6) constituting a pixel coverage of said serving antenna by selecting all of said pixels having a shortest distance to said serving antenna;

(10.7) constructing a rectangular area covering said pixel coverage; and (10.8) constructing a circle having a center being the intersecting point of the diagonal lines of said rectangular area and a radius of one-half of said diagonal line.

11. An enhanced cell coverage system for utilization in a cellular mobile communication system having a plurality of coverage cells, a plurality of antennas, a plurality of mobile terminals, and a timing advance (TA) cell coverage device for determining a cell coverage by a TA method, said enhanced cell coverage system comprising:

an enhanced cell coverage device determining a location having an enhanced resolution in the cellular mobile communication system; and a selector, coupled to the timing advance cell coverage device and to said enhanced cell coverage device, for selecting between the cell coverage generated by the timing advance cell coverage device and an enhanced cell coverage generated by said enhanced cell coverage device, said selection being responsive to the greater of the TA resolution and said enhanced resolution.

12. The enhanced cell coverage system of claim 11 wherein said enhanced cell coverage device comprises:

coverage distribution means for distributing the sections responsive to the shortest distance of a cell to an antenna; and enhanced cell coverage generating means, coupled to said coverage distribution means, for generating a plurality of enhanced cell coverages of the antennas responsive to said coverage distribution.

13. The device of claim 12, wherein said coverage distribution means comprises:

classifying means for classifying each of the antenna coverages as outdoor macro cells, outdoor micro cells and indoor micro cells, said classification responsive to the covering range, antenna directivity and traffic of said antenna;

pixel dividing means, coupled to said classifying means, for dividing said communication system coverage of the mobile system into a plurality of pixels; and pixel mapper means, coupled to said pixel dividing means, for constructing a pixel map including all of the locations of said plurality of pixels.

14. The device of claim 13, wherein said enhanced cell coverage generating means comprises:

distance calculation means, coupled to said pixel mapper means, for determining the distances between each of said plurality of pixels and its nearest one of the plurality antennas;

proximate antenna calculating means, coupled to said distance calculation means, for determining which one of the antennas has the shortest distance to a selected pixel, said antenna being a serving antenna of said selected pixel;

pixel coverage means, coupled to said proximate antenna calculating means, for constituting a pixel coverage of said serving antenna by selecting all of said pixels having a shortest distance to said serving antenna;

area coverage constructing means, coupled to said pixel coverage means, for constructing a rectangular area covering said pixel coverage; and circle constructing means, coupled to said area coverage constructing means, for determining said enhanced cell coverage by defining a circle having a center being the intersecting point of the diagonal lines of said rectangular area and a radius of one-half of said diagonal line for determining an enhanced cell coverage.

15. The enhanced cell coverage system of claim 11, wherein the cellular mobile communication system utilizes time-division multiple access.

16. The device claim 15, wherein the time-division multiple access mobile communication system is a digital GSM system.

17. The enhanced cell coverage system of claim 11 further comprising an information transceiver system, including an information database, for receiving location information from the plurality of mobile terminals, and for transmitting enhanced cell coverage information from said enhanced cell coverage device to the plurality of mobile terminals for locating a mobile terminal.

* * * * *